US007048184B2

(12) United States Patent
Persky

(10) Patent No.: US 7,048,184 B2
(45) Date of Patent: May 23, 2006

(54) MULTIPLE SELF-CHECKOUT SYSTEM HAVING INTEGRATED PAYMENT DEVICE

(75) Inventor: Michael Persky, New Canaan, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/464,098

(22) Filed: Jun. 18, 2003

(65) Prior Publication Data

US 2004/0069848 A1 Apr. 15, 2004

Related U.S. Application Data

(60) Provisional application No. 60/390,721, filed on Jun. 21, 2002.

(51) Int. Cl.
*G06K 15/00* (2006.01)

(52) U.S. Cl. ...................................................... 235/383

(58) Field of Classification Search ................ 235/383, 235/375–377; 186/59, 61; 705/23, 16, 17, 705/21

See application file for complete search history.

(56) References Cited

U.S. PATENT DOCUMENTS

| | | | | | |
|---|---|---|---|---|---|
| 4,676,343 | A | * | 6/1987 | Humble et al. | 235/383 |
| 5,013,896 | A | | 5/1991 | Ono et al. | 235/381 |
| 5,311,969 | A | * | 5/1994 | Dickover et al. | 186/61 |
| 5,343,025 | A | * | 8/1994 | Usui | 235/383 |
| 5,412,191 | A | | 5/1995 | Baitz et al. | 235/383 |
| 5,426,282 | A | * | 6/1995 | Humble | 235/383 |
| 5,494,136 | A | * | 2/1996 | Humble | 235/383 |
| 5,497,853 | A | * | 3/1996 | Collins et al. | 235/383 |
| 5,662,190 | A | * | 9/1997 | Abe | 235/383 |
| 5,679,941 | A | * | 10/1997 | Iizaka et al. | 235/383 |
| 5,900,614 | A | * | 5/1999 | Nakakawaji et al. | 235/462.14 |
| 5,978,772 | A | | 11/1999 | Mold | 705/16 |
| 5,987,428 | A | * | 11/1999 | Walter | 705/23 |
| 6,213,395 | B1 | * | 4/2001 | Dejaeger et al. | 235/383 |
| 6,286,758 | B1 | | 9/2001 | Dejaeger et al. | 235/383 |
| 6,354,497 | B1 | * | 3/2002 | Lippert et al. | 235/383 |
| 6,363,355 | B1 | * | 3/2002 | Morrison et al. | 705/23 |
| 6,409,081 | B1 | * | 6/2002 | Nugent, Jr. | 235/383 |
| 6,427,914 | B1 | * | 8/2002 | Snyder | 235/383 |
| 6,540,137 | B1 | * | 4/2003 | Forsythe et al. | 235/383 |
| 6,715,677 | B1 | * | 4/2004 | Nugent, Jr. | 235/383 |

FOREIGN PATENT DOCUMENTS

| | | |
|---|---|---|
| EP | 0 811 958 A2 | 12/1997 |
| FR | 2 583 966 A | 1/1987 |
| GB | 2 161 631 A | 1/1986 |
| WO | WO 01 69495 A1 | 9/2001 |

OTHER PUBLICATIONS

Copy of International Search Report dated Nov. 24, 2003 for PCT/US03/19571.

* cited by examiner

*Primary Examiner*—Uyen-Chau N. Le
(74) *Attorney, Agent, or Firm*—Jeanine S. Ray-Yarletts

(57) ABSTRACT

A self-checkout system is presented which may include at least two self checkout stations and a single self-payment module for effecting payments and/or completing transactions conducted on each of the at least two self-checkout systems. The self-payment module may determine which of the two self-checkout stations utilizes the self-payment module upon both self-checkout stations being used at the same time.

23 Claims, 7 Drawing Sheets

MULTIPLE SELF-CHECKOUT SYSTEM HAVING INTEGRATED PAYMENT DEVICE

CLAIM TO PRIORITY

The present invention claims priority under 35 U.S.C. § 119(e) of U.S. provisional patent application No. 60/390,721, filed Jun. 21, 2002, the entire disclosure of which is herein incorporated by reference.

FIELD OF INVENTION

The present invention relates to self-service checkout systems ("self-checkout systems"), and more particularly to self-service checkout systems that may be installed into existing checkout counters/systems. Embodiments also include a self-payment unit that is capable of servicing one or more self-checkout stations, and which may be also operated in any of a first mode for self-checkout and an attendant mode.

BACKGROUND OF INVENTION

The retail merchandiser, drugstore and supermarket industries have placed an impetus on reducing labor costs. Additionally they have expended energy in a variety of different ways to reduce or eliminate the amount of time required to process items to be purchased by a customer. To this end, there have been a number of self-service checkout systems developed which attempt to substantially eliminate the need for a checkout clerk. Self-service checkout systems/stations permit customers to process and pay for their purchase with little or no retailer personnel assistance.

Commonly-assigned U.S. Pat. No. 4,676,343 and U.S. Pat. No. 4,792,018, hereby incorporated by reference, disclose systems for the self-checkout of articles selected by a customer for purchase in supermarkets and other retail establishments. The former patent involves an arrangement for purchasing articles which bear a "universal product code" (UPC), a unique code for indicating the identity of the article bearing the code. The UPC of each article selected for purchase is scanned or read into the self-checkout station and a signal indicative of the article identity is generated and sent to a central processing unit (CPU) which has stored (in an associated memory) a list of the UPCs of all articles available for purchase which are so encoded. Accordingly, the list may be a lookup table that includes the price and other characteristics for the scanned in articles (e.g., weight).

Scanned articles are placed on a conveyor following UPC scanning and are then led into a security tunnel, which is used to guard against customer fraud using, for example, various "light curtains" to indicate whether the article has been placed in the tunnel (for example). In the course of article conveyance, its weight is physically measured and a signal is generated indicative of the measurement. This signal is then compared to the weight of the article stored in the memory associated with the CPU. If the measured weight is not within a predetermined range of the weight of the article in memory, the article is rejected (e.g., direction of conveyor is reversed).

In the latter patent, a number of further security measures are affected to detect customer fraud or checkout failure. In one such additional measure, article shape is detected, such as by the light curtain at the entry to the security tunnel. The CPU storage includes, along with the article identity code, a cross-correlation of article shape. This compilation is desirably made from the system itself, as by storage of detected article shape in a system set up mode, through use of the light curtain output signals.

There are typically two methods of payment for self-checkout devices. In one method, when a shopper completes the transaction a receipt is printed at the scanning location, which is then brought by the shopper to a checkout clerk who then completes the transaction by processing payment. This results in the retail establishment requiring personnel to be assigned to a payment station, which, depending upon the number of self-checkout station the store contains, may create a backup of people who want to pay for the their purchase, but must wait for others.

In the other method, the shopper tenders payment at the individual lane when a transaction is complete. Accordingly, in order to perform this method, the self-checkout system must include a payment device/mechanism, which accepts, for example, cash and/or credit (debit/ebt, etc.). Although this method removes the need for a store attendant, it requires a larger self-checkout device (e.g., the self-checkout counter and payment mechanism) which takes up more space that a non self-checkout station, and is substantially higher in cost.

Accordingly, it would be advantageous to provide smaller self-checkout stations which may be easily integrated into an existing checkout counter/system area of a retail establishment, especially small retailers who do not have floor space to spare for housing currently available self-checkout systems.

SUMMERY OF THE INVENTION

Embodiments of the present invention address the above concerns and are directed to systems which take up less space than existing self-checkout systems by, for example, fitting into an existing checkout counter/system and are more cost effective. In that regard, some embodiments of the present invention may be integrated with one or more existing checkout counters/systems of a retail establishment.

Specifically, some embodiments of the present invention include a single payment module and multiple self-checkout stations that can be easily integrated into a retail establishment's existing checkout counter/system, thereby eliminating the need to clear floor space to accommodate the self-checkout unit. The common payment module may allow for multiple self-service tendering configurations, including the ability to convert back and forth between self-checkout and conventional checkout mode using an attendant.

A payment module according to some of the embodiments of the present invention may include means for accepting payment by way of cash, credit, debit, electronic benefits, and/or promotional/gift cards. To that end, the payment module for particular embodiments of the present invention may be customized or configured to handle only one type of payment (e.g. credit only, cash only) and include appropriate devices for handling such payments (e.g., bill/coin acceptors and/or dispenser(s), electronic payment card reader, pin-pad, signature capture device, and the like).

Accordingly, in one embodiment of the present invention, a checkout system for conducting purchasing transactions is provided which may include at least two self-checkout stations and a single self-payment module for effecting payments for transactions conducted on each of the at least two self-checkout systems.

In another embodiment of the present invention, a self-checkout system for conducting purchasing transactions may include at least two self-checkout stations. At least one of the self-checkout stations may include a display and one or more security devices for aiding in the prevention of customer fraud. The one or more security devices may comprise at least one of a physical characteristic measurement device (PCMD), which produces a signal indicative of a measured characteristic of an item for comparison to a stored value of the measured characteristic. The at least one of the self-checkout stations is configurable for use as an attendant checkout system. The system may also include a single self-payment module for effecting payments for transactions conducted on each of the at least two self-checkout systems. The self-payment module may include at least one or more of a coin acceptor, a bill acceptor, a electronic payment card reader, a signature capture device, a pin-pad, a coin dispenser, a bill dispenser and a coupon compartment.

In still another embodiment of the present invention, a method for conducting transactions for a self-checkout system is provided using, for example, either system described in the above two embodiments. The method may include receiving a first signal at a first time, the first signal indicating that a first self-checkout, station is ready to tender payment and complete a transaction conducted on the first self-checkout station. The method may also include receiving a second signal at a second time, the second signal indicating that a second self-checkout station is ready to tender payment and complete a transaction conducted on the second self-checkout station. A determination of priority for completing a respective transaction of the first self-checkout system and the second self-checkout system is conducted based upon the earlier of the first time and the second-time. Completing the transaction may include at least tending payment in at least one of cash, credit, debit and EBT at the self-payment module.

Upon completing a transaction, the self-payment module may be set to process another payment for a self-checkout station. The method may further include selecting the self-checkout station for completing the respective transaction first based upon the determined priority. Upon the first time being the same time as the second time, the priority is awarded to the first self-checkout station. The transaction is then completed for the selected self-checkout system determined to have first priority, and the transaction for the remaining self-checkout system determined to have second priority is then completed.

Yet another embodiment of the present invention provides a checkout system for conducting purchasing transactions which may include a self-checkout station having a payment module, a shopper side accessible by a shopper and an attendant side different from the shopper side which is accessible by an attendant. The self-checkout station may be configurable to operate in a first mode for operation by a shopper and a second mode for operation by an attendant.

Still other embodiments of the present invention may include computer readable media and one or more computer application programs for enabling a computer system to perform any method embodiment of the present invention.

These and other advantages, objects and features of the invention will be apparent through the detailed description of the embodiments and the drawings attached hereto. It is also to be understood that both the foregoing general description and the following detailed description are exemplary and not restrictive of the scope of the invention.

DETAILED DESCRIPTION OF THE EMBODIMENTS

The embodiments will now be described with reference to the drawings. For example purposes only, embodiments of the present invention will be described in the context of use in a retail store setting. This example is not meant to limit the present invention, as one of skill in the art will understand that embodiments of the present invention may be used in any purchasing establishment, retail or otherwise, as well as non-retail establishments such as public libraries.

Figure 1:
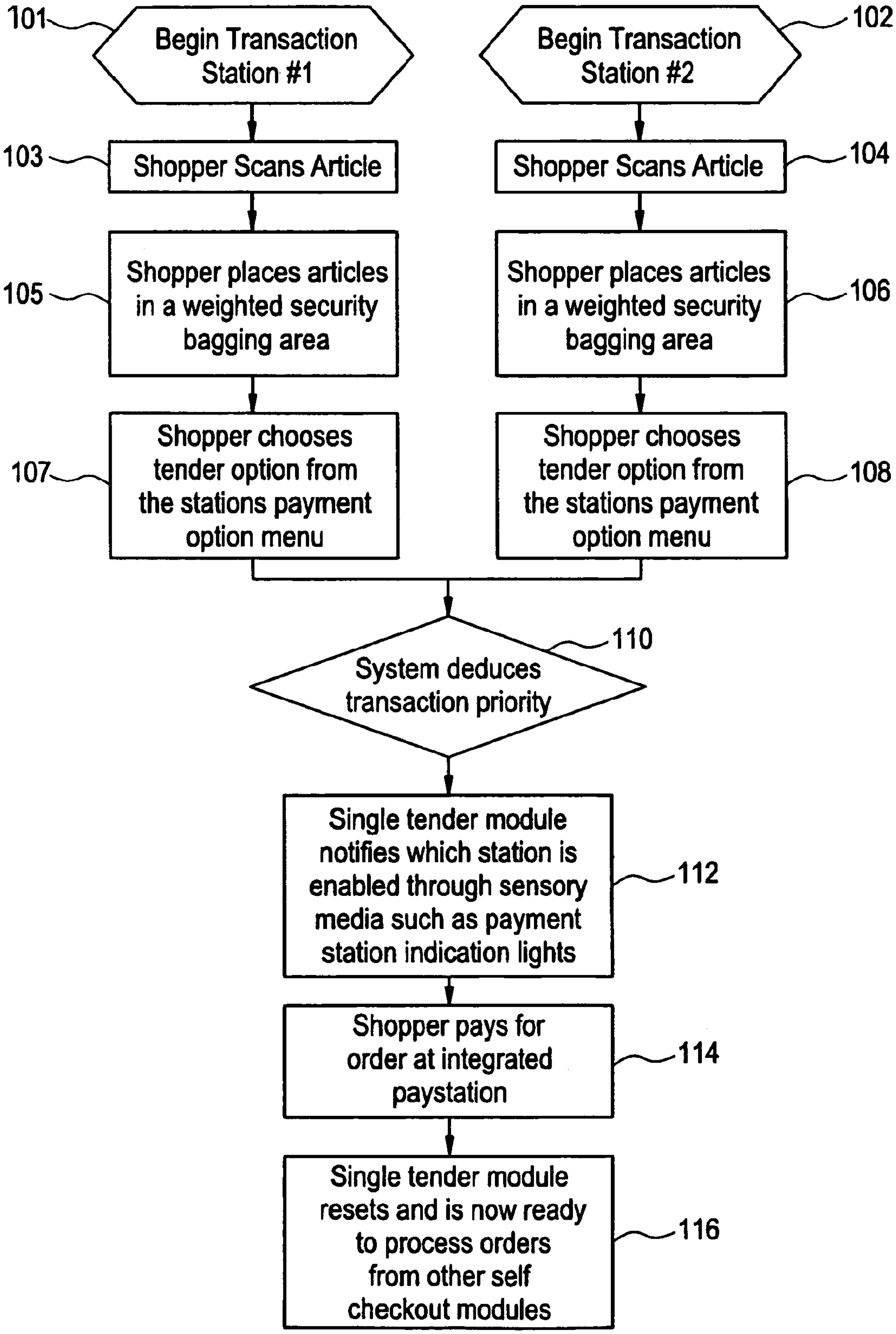
FIG. 1 is a flowchart illustrating a process flow for a method according to an embodiment of the present invention.

FIG. 1 is a flowchart which illustrates the process flow of a self-checkout system having two stations available for checkout and a single payment module. Examples of self-checkout areas having two or more self-checkout stations with a single payment module are shown in FIGS. 2–7. Accordingly, in a first station, a shopper scans articles for checkout, which may include placing the scanned articles (one at a time or together) in a security device (e.g., weighing mechanism, dimension analyzer, and/or the like) (see steps 101, 103 and 105). At substantially the same time, for example, a shopper at a second station may begin a purchasing process and initiates the scanning of articles and placing them in the corresponding security device (see steps 102, 104 and 106).

At the end of a respective shopping transaction, each respective shopper selects a payment (tender) option (see steps 107 and 108). At that time, the payment module may then make a determination as to which shopper has priority (e.g., the first shopper in time to select the payment option) (110). At that point, the payment module processes the first shopper who selected a payment option. The station which is then tendering payment may be indicated as such by a light and/or sound (112). Of course, if both shoppers select to make payment at exactly the same time, a default procedure may be run which selects the shopper at one or the other self-checkout stations to complete his/her transaction (e.g., station one, then station two).

Accordingly, the shopper at the particular selected station then tenders payment (e.g., coins, cash, debit, credit and/or EBT) (114). Once the payment has been accepted, and the transaction is complete, the payment module may then be reset (preferably automatically), and may then be ready to process payments from other stations (e.g., station 2)(116).

Figure 2:
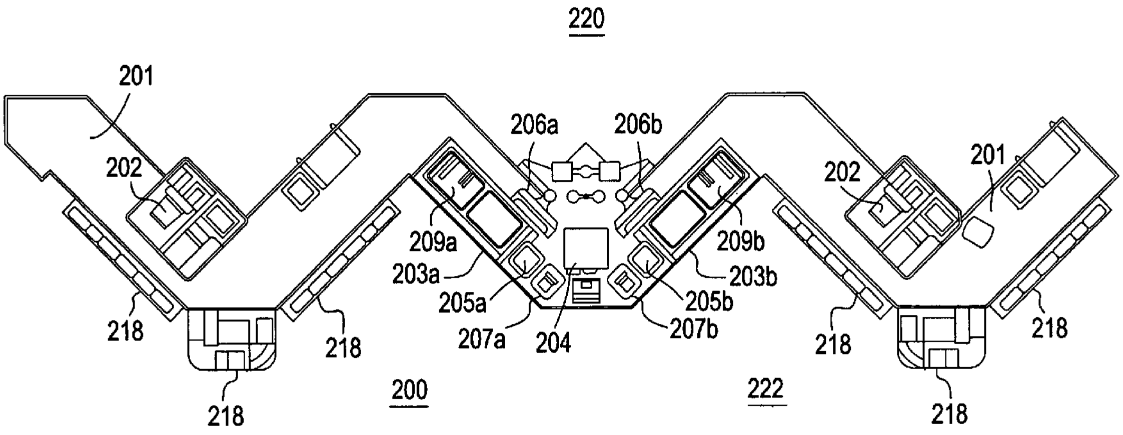
FIG. 2 illustrates a top view of a self-checkout system according to an embodiment of the present invention.
Figure 3:
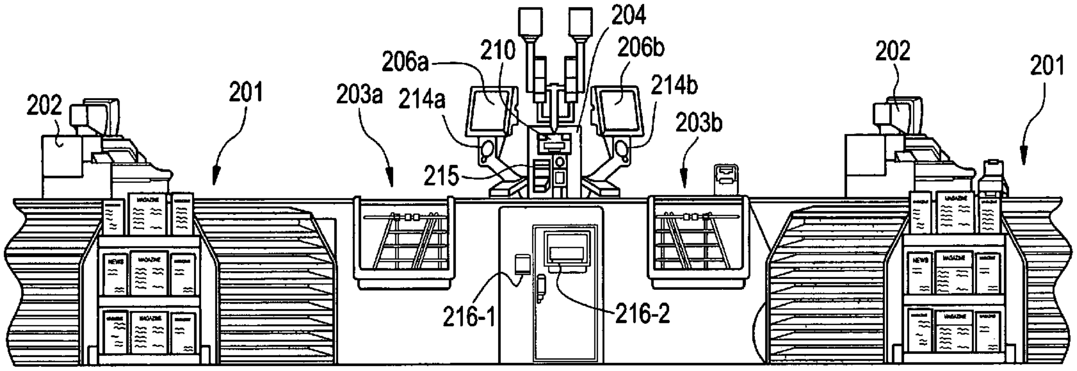
FIG. 3 illustrates a front view of the self-checkout system according to the embodiment of the present invention illustrated in FIG. 2.
Figure 4:
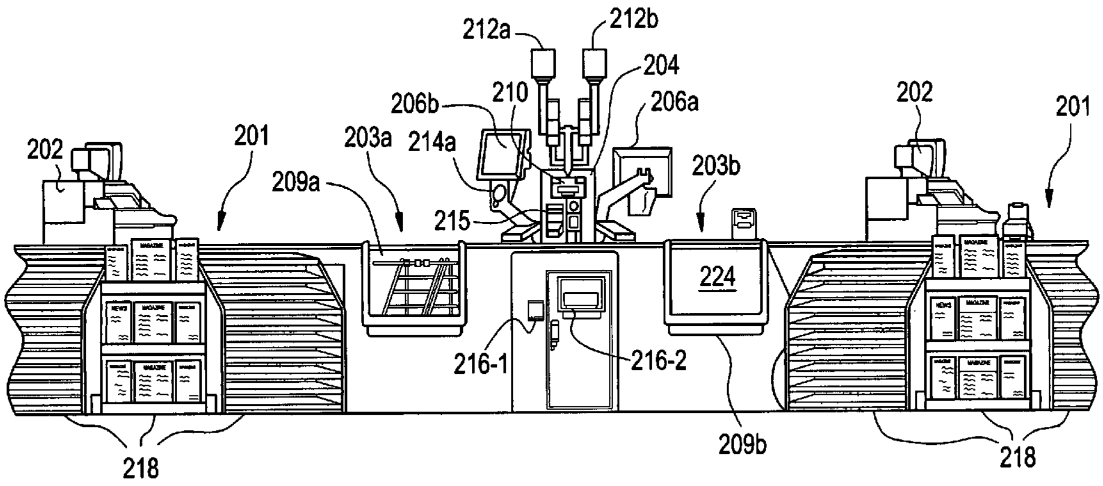
FIG. 4 illustrates a front view of the self-checkout system shown in FIGS. 2 and 3, illustrating the capability of one or more self-checkout stations being converted into an attendant checkout system.

FIGS. 2–4 illustrates one embodiment of a self-checkout system 200 according to the present invention. The self-checkout system preferably includes an attendant side 220 and a shopper side 222. The checkout system may be positioned among one or more existing checkout counters 201, where each may include an attendant station 202 and various point-of-sale displays 218. Two self-checkout stations 203*a*, 203*b* may be provided at the checkout area and positioned between the two attendant stations. For convenience, a shared self-service payment module/system 204 is provided between the two self-checkout stations for shoppers at the self-checkout stations so that each may tender payment at the completion of a respective transaction.

Each self-checkout area may include a display 206*a*, 206*b*, a UPC scanner/scale 205*a*, 205*b* to scan article UPC codes and/or weigh produce (for example), a bagging and security area 209*a*, 209*b*, as well as an integrated electronic payment card reader/pin-pad, and signature capture device 207*a*, 207*b*. An audio speaker 214*a*, 214*b* may be provided in each station so that each shopper may be provided with verbal prompts for guiding the shopper,through the self-checkout transaction. An attendant notification light 212*a*, 212*b* notifies store personnel that a shopper needs assistance at a respective self-checkout station. The self-payment module may include a shopper priority payment notification indicator 210, cash input devices 215 (e.g., coin acceptor, bill acceptor), cash dispensing devices 216 (coin dispenser 216-1, bill dispenser 216-2) and a coupon collection compartment 217.

FIG. 4 illustrates the ability of one or more of the self-service stations being used in an attendant mode. As shown, display 206*b* is swiveled so that it can be seen by an attendant on the opposite side of the checkout area than the shopper. Also, the bagging and security area 209*b* may be closed with a cover 224, so that it may be clear to a shopper approaching that station that it is not presently operating in a self-checkout mode. Moreover, in such a system a cash box 219 (see FIG. 5) may be positioned on the attendant side so that the attendant may accept and/or dispense cash.

Figure 5:
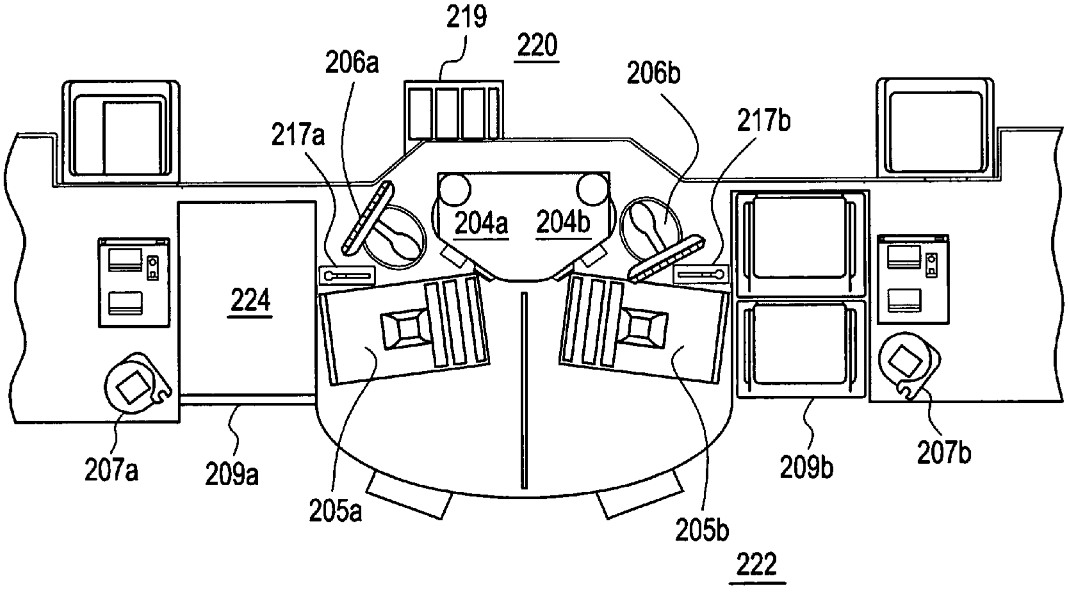
FIG. 5 illustrates a top view of another self-checkout system according to another embodiment of the present invention.
Figure 6:
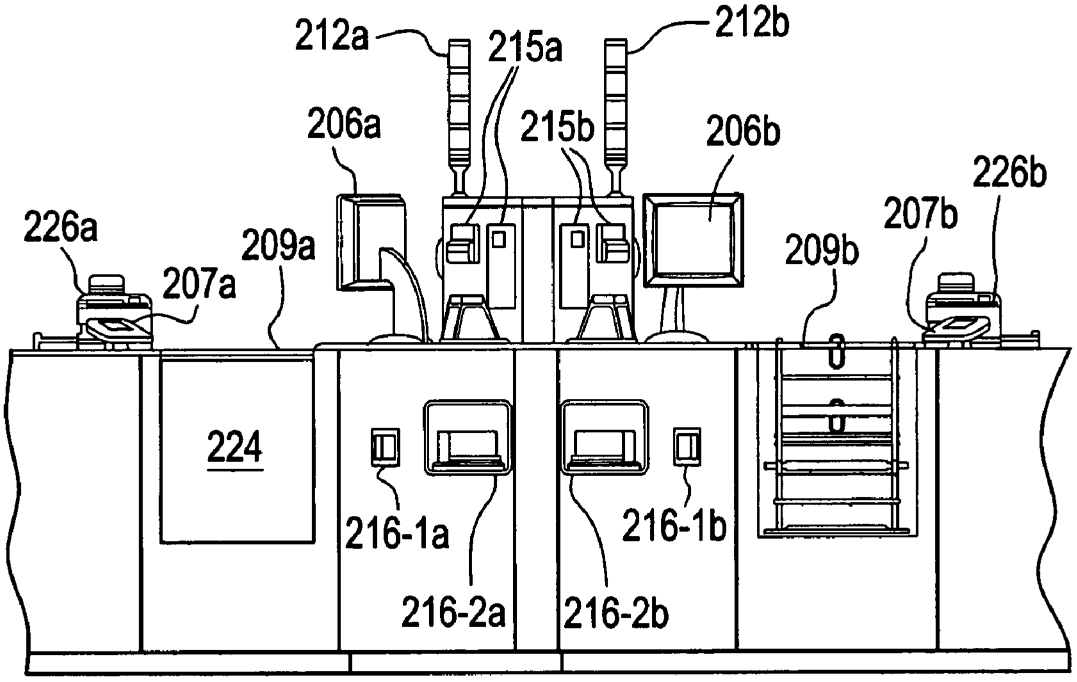
FIG. 6 illustrates a front view of the self-checkout system illustrated in FIG. 5.
Figure 7:
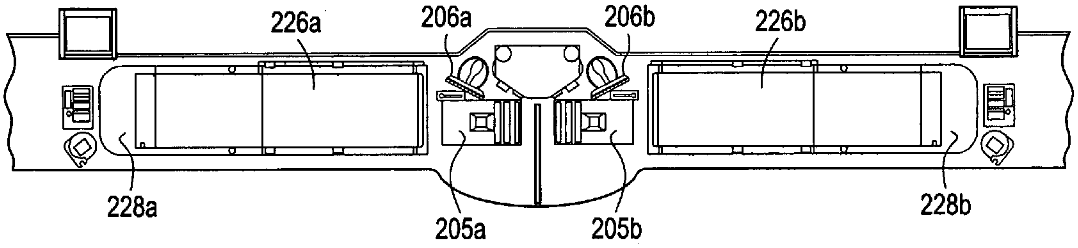
FIG. 7 illustrates a top view of an alternative arrangement for a self-checkout system using conveyors for security and/or for transporting scanned items to a bagging area.

FIGS. 5–6 illustrate a checkout area having two self-checkout stations which may used in both a self-checkout mode as well as an attendant mode. As shown in the figures, display 206*a* may be swiveled to operate in an attendant mode, while 206*b* is swiveled to operate in a self-checkout mode. Upon self-checkout station being converted to an attendant mode, cover 224 may be placed in the bagging and security area 209*a*, for example. In these embodiments, each self-checkout station may be provided with a respective scanner 205*a*, 205*b* and a self-payment module 204*a*, 204*b*. Each self-payment module may include an integrated pin-pad, credit-card reader and signature capture device 207*a*, 207*b*, printer 226*a*, 226*b* (for printing receipts, coupons, and the like), cash input devices 215*a*, 215*b*, cash dispensing devices (coin dispenser 216-1*a*, 216-1*b*, bill dispenser 216-2*a*, 216-2*b* and coupon collection compartment 217*a*, 217*b*. FIG. 7 illustrates a similar self-checkout system as that illustrated in FIGS. 5 and 6, except that a conveyor system 226*a*, 226*b*, which may include one or more conveyors and which may also include an integrated security device as disclosed in U.S. Pat. No. 4,676,343, directs scanned articles for purchase to a bagging area 228*a*, 228*b*.

As illustrated, the self-checkout stations of FIGS. 5–6 may be easily integrated into an existing checkout counter arrangement providing great space savings from existing self-checkout systems of the prior art and at a lower cost.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of any references cited throughout this application are hereby incorporated by reference. The appropriate components, processes, and methods of those documents may be selected for the present invention and embodiments thereof.

What is claimed is:

1. A self-checkout system for conducting purchasing transactions comprising a self-checkout side and an attendant side, at least two self-checkout stations and a single self-payment module for effecting payments for transactions conducted on each of the least two self-checkout stations, wherein a plurality of the at least two self-checkout stations and the single self-payment module are all operable for scanning items for purchase and payment therof, respectively, from the self-checkout side, wherein selecting a self-checkout station for completing the respective transaction first based upon a determined priority, wherein upon a first time being the same time as a second time, the priority is awarded to a first self-checkout station.

2. The self-checkout system according to claim 1, wherein the self-payment module includes at least one or more of a coin acceptor, a bill acceptor, a electronic payment card reader, a signature capture device, a pin-pad, a coin dispenser, a bill dispenser and a coupon compartment.

3. The self-checkout system according to claim 1, wherein at least one of the self-checkout stations is configurable for use as an attendant checkout system.

4. The self-checkout system according to claim 3, further comprising a cash box for use by the attendant.

5. The self-checkout system according to claim 3, wherein upon the at least one self-checkout stations being operable in an attendant mode, a respective display is rotatable to an attendant position.

6. The self-checkout system according to claim 1, wherein at least one of the self-checkout stations include one or more security devices for aiding in the prevention of customer fraud.

7. The self-checkout system according to claim 6, wherein the one or more security devices comprise at least one of a physical characteristic measurement device (PCMD), wherein the PCMD produces a signal indicative of a measured characteristic of an item for comparison to a stored value of the measured characteristic.

8. The self-checkout system according to claim 7, wherein the PCMD comprises a scale.

9. The self-checkout system according to claim 6, wherein the one or more security devices comprise at least one of video surveillance, RFID item verification, EAS item verification and optical recognition item verification.

10. The self-checkout system according to claim 1, further comprising at least one conveyor system for moving purchased items from one or more of the at least two self-checkout stations to a bagging area.

11. The self-checkout system according to claim 10, wherein the at least one conveyor includes one or more security devices for aiding in prevention of customer fraud.

12. The self-checkout system according to claim 11, wherein the one or more security devices comprise at least one of a physical characteristic measurement device (PCMD), wherein the PCMD produces a signal indicative of a measured characteristic of an item for comparison to a stored value of the measured characteristic.

13. The self-checkout system according to claim 1, wherein at least one of the self-checkout stations includes a display.

14. The self-checkout system according to claim 1, wherein the at least two self-checkout stations and self-payment module are arranged in a single counter arrangement.

15. A self-checkout system for conducting purchasing transactions comprising:

a self-checkout side and an attendant side;

at least two self-checkout stations, wherein:

at least one of the self-checkout stations includes one or more security devices for aiding in prevention of customer fraud and a display;

the one or more security devices comprise at least one of a physical characteristic measurement device (PCMD);

the PCMD produces a signal indicative of a measured characteristic of an item for comparison to a stored value of the measured characteristic; and at least one of the self-checkout stations configurable for use as an attendant checkout system; and a single self-payment module for effecting payments for transactions conducted on each of the at least two self-checkout systems; wherein a plurality of the at least two self-checkout stations and the single self-payment module are all operable for scanning items for purchase and payment thereof, respectively, from the self-checkout side, wherein selecting a self-checkout station for completing the respective transaction first based upon a determined priority, wherein upon a first time being the same time as a second time, the priority is awarded to a first self-checkout station.

16. The checkout system according to claim 15, wherein the self-checkout station is provided in an existing checkout counter area.

17. The self-checkout system according to claim 15, wherein the at least two self-checkout stations and self-payment module are arranged in a single counter arrangement.

18. A method for conducting transactions for a self-checkout system, wherein the self-checkout system includes at least two self-checkout stations and a single self-payment module for effecting payments and/or completing transactions conducted on each of the at least two self-checkout systems, the method comprising:

receiving a first signal at a first time, the first signal indicating that a first self-checkout station is ready to tender payment and complete a transaction conducted on the first self-checkout station;

receiving a second signal at a second time, the second signal indicating that a second self-checkout station is ready to tender payment and complete a transaction conducted on the second self-checkout station;

determining a priority of completing a respective transaction of the first self-checkout system and the second self-checkout system based upon the earlier of the first time and the second time, wherein completing the transaction comprises at least tending payment in at least one of cash, credit, debit and EBT (electronic benefits transfer) at the self-payment module, and wherein upon completing a transaction, the self-payment module is set to process another payment for a self-checkout station;

selecting the self-checkout station for completing the respective transaction first based upon the determined priority, wherein upon the first time being the same time as the second time, the priority is awarded to the first self-checkout station;

completing the transaction of the selected self-checkout system determined to have first priority; and completing the transaction of the self-checkout system determined to have second priority.

19. The method according to claim 18, wherein tendering payment includes at least one of turning over at least the amount due for the transaction with at least one or more of coins, bills, credit, debit and EBT (electronic benefit transfer), and receiving change, cash back, credit, a receipt,and/or a coupon.

20. A computer readable medium having computer instructions provided thereon for enabling a computer system to perform a method for conducting transactions for a self-checkout system, wherein the self-checkout area includes at least two self-checkout stations and a single self-payment module for effecting payments and/or completing transactions conducted on each of the at least two self-checkout systems, the method comprising:

receiving a first signal at a first time, the first signal indicating that a first self-checkout station is ready to tender payment and complete a transaction conducted on the first self-checkout station;

receiving a second signal at a second time, the second signal indicating that a second self-checkout station is ready to tender payment and complete a transaction conducted on the second self-checkout station;

determining a priority of completing a respective transaction of the first self-checkout system and the second self-checkout system based upon the earlier of the first time and the second time, wherein completing the transaction comprises at least tending payment in at least one of cash, credit, debit and EBT (electronic benefit transfer) at the self-payment module, and wherein upon completing a transaction, the self-payment module is set to process another payment for a self-checkout station;

selecting the self-checkout station for completing the respective transaction first based upon the determined priority, wherein upon the first time being the same time as the second time, the priority is awarded to the first self-checkout station;

completing the transaction of the selected self-checkout system determined to have first priority; and completing the transaction of the self-checkout system determined to have second priority.

21. The computer readable medium according to claim 20, wherein tendering payment includes at least one of turning over at least the amount due for the transaction with at least one or more of coins, bills, credit, debit and EBT (electronic benefit transfer), and receiving change, cash back, credit, a receipt, and/or a coupon.

22. A computer application program operable on a computer for enabling a computer system to perform a method for conducting transactions for a self-checkout system, wherein the self-checkout system includes at least two self-checkout stations and a single self-payment module for effecting payments and/or completing transactions conducted on each of the at least two self-checkout systems, the method comprising:

receiving a first signal at a first time, the first signal indicating that a first self-checkout station is ready to tender payment and complete a transaction conducted on the first self-checkout station;

receiving a second signal at a second time, the second signal indicating that a second self-checkout station is ready to tender payment and complete a transaction conducted on the second self-checkout station;

determining a priority of completing a respective transaction of the first self-checkout system and the second self-checkout system based upon the earlier of the first time and the second time, wherein completing the transaction comprises at least tending payment in at least one of cash, credit, debit and EBT (electronic benefit transfer) at the self-payment module, and wherein upon completing a transaction, the self-payment module is set to process another payment for a self-checkout station;

selecting the self-checkout station for completing the respective transaction first based upon the determined priority, wherein upon the first time being the same time as the second time, the priority is awarded to the first self-checkout station;

completing the transaction of the selected self-checkout system determined to have first priority; and completing the transaction of the self-checkout system determined to have second priority.

23. The application program according to claim 22, wherein tendering payment includes at least one of turning over at least the amount due for the transaction with at least one or more of coins, bills, credit, debit and EBT, and receiving change, cash back, credit, a receipt, and/or a coupon.

* * * * *